United States Patent
Iinuma (10) Patent No.: US 7,110,794 B1
(45) Date of Patent: Sep. 19, 2006

(54) ADAPTIVE ARRAY APPARATUS AND COMPENSATION METHOD FOR COMPENSATING A PHASE DIFFERENCE USED FOR GENERATING A DIRECTIVITY RESPONSE PATTERN

(75) Inventor: Toshinori Iinuma, Gifu (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/856,499

(22) PCT Filed: Dec. 15, 1998

(86) PCT No.: PCT/JP98/05652

§ 371 (c)(1),
(2), (4) Date: Jun. 13, 2001

(87) PCT Pub. No.: WO00/36701

PCT Pub. Date: Jun. 22, 2000

(51) Int. Cl.
*H04M 1/00* (2006.01)

(52) U.S. Cl. .................... 455/562.1; 342/373

(58) Field of Classification Search ........... 455/423, 455/67.16; 375/219, 285, 232; 342/373, 342/174, 372, 42, 50
See application file for complete search history.

(56) References Cited

U.S. PATENT DOCUMENTS 5,546,090 A * 8/1996 Roy, III et al. ............ 342/174
5,767,806 A * 6/1998 Watanabe et al. .......... 342/373
6,058,318 A * 5/2000 Kobayakawa et al. ... 455/562.1
6,243,412 B1 * 6/2001 Fukawa ...................... 375/219

FOREIGN PATENT DOCUMENTS

| EP | 0 837 523 A2 | 4/1998 |
|---|---|---|
| JP | 59-45582 | 3/1984 |
| JP | 61117902 A | 6/1986 |
| JP | 01154604 A | 6/1989 |
| JP | 06216625 A | 8/1994 |
| JP | 9-138270 | 5/1997 |
| JP | 10-126139 | 5/1998 |

OTHER PUBLICATIONS

"Spectral efficiency improvement by base station antenna pattern control for land mobile cellular systems," The Institute of Electronics, Information and Communication Engineers; Technical Report of IEICE, MW93-25, RCS93-8 (May 1993), pp. 55-60, No Month Listed.
International Publication No. WO98/56121, published Dec. 10, 1998 & EP 0 961 416 A, published Dec. 1, 1999.

* cited by examiner

*Primary Examiner*—Temica Beamer
*Assistant Examiner*—Joy K. Contee
(74) *Attorney, Agent, or Firm*—Arent Fox, PLLC (57) ABSTRACT

An adaptive array apparatus includes a control unit 50 and a plurality of radio units 10~40 that each have a modulator 11, a transmission circuit 12, a switch 13, a phase detecting unit 14, a reception circuit 15, and a demodulator 16. For each radio unit 10~40, the control unit 50 compensates a phase amount for generating a directivity pattern used for an output signal according to a difference in phase shift amounts between a transmission subsystem and a reception subsystem.

9 Claims, 7 Drawing Sheets

ADAPTIVE ARRAY APPARATUS AND COMPENSATION METHOD FOR COMPENSATING A PHASE DIFFERENCE USED FOR GENERATING A DIRECTIVITY RESPONSE PATTERN

TECHNICAL FIELD

The present invention relates to an adaptive array apparatus that adaptively generates a directivity pattern for a plurality of antennas and to a compensation method for compensating a phase amount used when generating a directivity pattern.

BACKGROUND ART

To raise transfer efficiency, digital communication devices that transfer information by modulating a carrier wave using a digital information signal (baseband signal) have been developed in recent years.

In digital communication, frequencies can be more efficiently used by raising the transfer speed and converting single frequencies into multichannels for use by several users. Raising the transfer speed, however, leads to deterioration in quality due to fading.

A number of techniques to counteract this problem have been developed. A representative technique is the adaptive array method. This method adaptively generates a directivity pattern using a plurality of antennas and generates an electromagnetic wave so that it only reaches a specified user. First, consider an adaptive array apparatus that has four communication subsystems that each include a transmission circuit, a reception circuit, and an antenna. Separate directivity patterns for transmission and reception can be generated for each communication subsystem by adjusting the gain and phase of each transmission circuit during transmission and by adjusting the gain and phase of each reception circuit during reception. The adaptive array method is described in detail in *Adaptive Signal Processing for Spatial Regions and Its Technical Applications* (in "Transactions of the Institute of Electronics and Communication Engineers of Japan") Vol. J75-B-II No. 11, November 1992.

To perform bidirectional communication using the adaptive array method, it is desirable to have directivity patterns formed by both devices in communication. When this is applied to mobile communication, however, the physical limitations on the size of the mobile devices and the number of antennas used by them make it effectively impossible for mobile devices to form a directivity pattern. Accordingly, the base station forms separate directivity patterns for both transmission and reception. This means that during transmission, the base station forms a directivity pattern that is the same as the ideal directivity pattern that was formed during reception and transmits signals.

The adaptive array method has a problem in that it has been difficult for the base station to form the same directivity pattern during reception and transmission. A directivity pattern is formed by adjusting the gain and phase for each antenna. However, even if transmission is performed with the same phase as was used during reception, differences exist in the propagation characteristics (in particular, phase shift characteristics) of the reception circuit and transmission circuit. These differences have prevented the formation of the same directivity patterns for reception and transmission. The differences in propagation characteristics between the transmission circuit and reception circuit are due to the differences in circuit construction. These differences would still be present even if the same circuit construction were used, due to inconsistencies in the circuit components. This is to say, inconsistencies in the characteristics of actual circuit components lead to inconsistencies in radio circuits that are formed using such components.

DISCLOSURE OF INVENTION

In view of the stated problems, it is a primary object of the present invention to provide an adaptive array apparatus that facilitates the matching of a directivity pattern during transmission with a directivity pattern during reception.

The object of the present invention can be achieved by an adaptive array apparatus that includes a plurality of radio units that each have a transmitting unit, a receiving unit, and an antenna, the adaptive array apparatus including: a storing unit for storing a separate compensation value for each radio unit, each compensation value reflecting phase propagation characteristics of the receiving unit and the transmitting unit in the corresponding radio unit; and a compensating unit for compensating, for each radio unit, a phase amount used when generating a directivity pattern for an output signal by adding the compensation value corresponding to the radio unit to the phase amount.

With the stated construction, compensation values reflecting the phase propagation characteristics of the transmitting unit and receiving unit in each radio unit are stored in the storing unit. These phase propagation characteristics are due to the characteristics of the various circuit components in the transmitting unit and receiving unit. The compensating unit adds a compensation value corresponding to a radio unit to a phase amount used by the transmitting unit in the radio unit to generate a directivity pattern. As a result, the directivity pattern during transmission can easily be matched with the directivity pattern during reception.

Here, the adaptive array apparatus may further include: a generating unit for generating the compensation value for each radio unit in accordance with the phase propagation characteristics of the receiving unit and the transmitting unit in the radio unit, the storing unit storing the compensation values generated by the generating unit.

The generating unit may include: a generating subunit for generating test signals; a first detecting unit for detecting, when a test signal passes the transmitting unit in a radio unit, a first phase shift value for the radio unit; a second detecting unit for detecting, when the test signal passes the transmitting unit and the receiving unit in order in the radio unit, a second phase shift value for the radio unit; and a calculating unit for calculating a phase shift difference between the receiving unit and the transmitting unit in a radio unit using the first phase shift value and the second phase shift value of the radio unit, and for setting the calculated phase shift difference as the compensation value for the radio unit.

With the stated construction, compensation values can be generated with a simple construction that has a generating subunit, a first detecting unit, a second detecting unit, and a calculating unit Here, the calculating unit may calculate the compensation values by performing a subtraction using the second phase shift value and a value that is double the first phase shift value.

Also, the generating unit may generate the compensation values at a predetermined interval.

With the stated construction, the generating unit can generate the compensation values at a predetermined interval. This means that if the characteristics of each radio unit of the adaptive array apparatus change over time, the generating unit will be able to generate a new compensation value for the radio unit(s) whose characteristics have changed.

The stated object of the present invention can also be achieved by a compensation method for use in an adaptive array apparatus that includes a plurality of radio units that each have a transmitting unit, a receiving unit, and an antenna, the compensation method compensating a phase amount that is used when generating a directivity pattern, the compensation method comprising:

a generating step for generating a separate compensation value for each radio unit, each compensation value reflecting phase propagation characteristics of the receiving unit and the transmitting unit in the corresponding radio unit; and a compensating step for compensating, for each radio unit, a phase amount used when generating a directivity pattern used for an output signal by adding the compensation value generated for the radio unit in the generating step to the phase amount.

This construction can achieve the same effects as those described above.

BRIEF DESCRIPTION OF DRAWINGS

These and other objects, advantages and features of the invention will become apparent from the following description thereof taken in conjunction with the accompanying drawings which illustrate a specific embodiment of the invention. In the drawings.

BEST MODE FOR CARRYING OUT THE INVENTION

Figure 1:
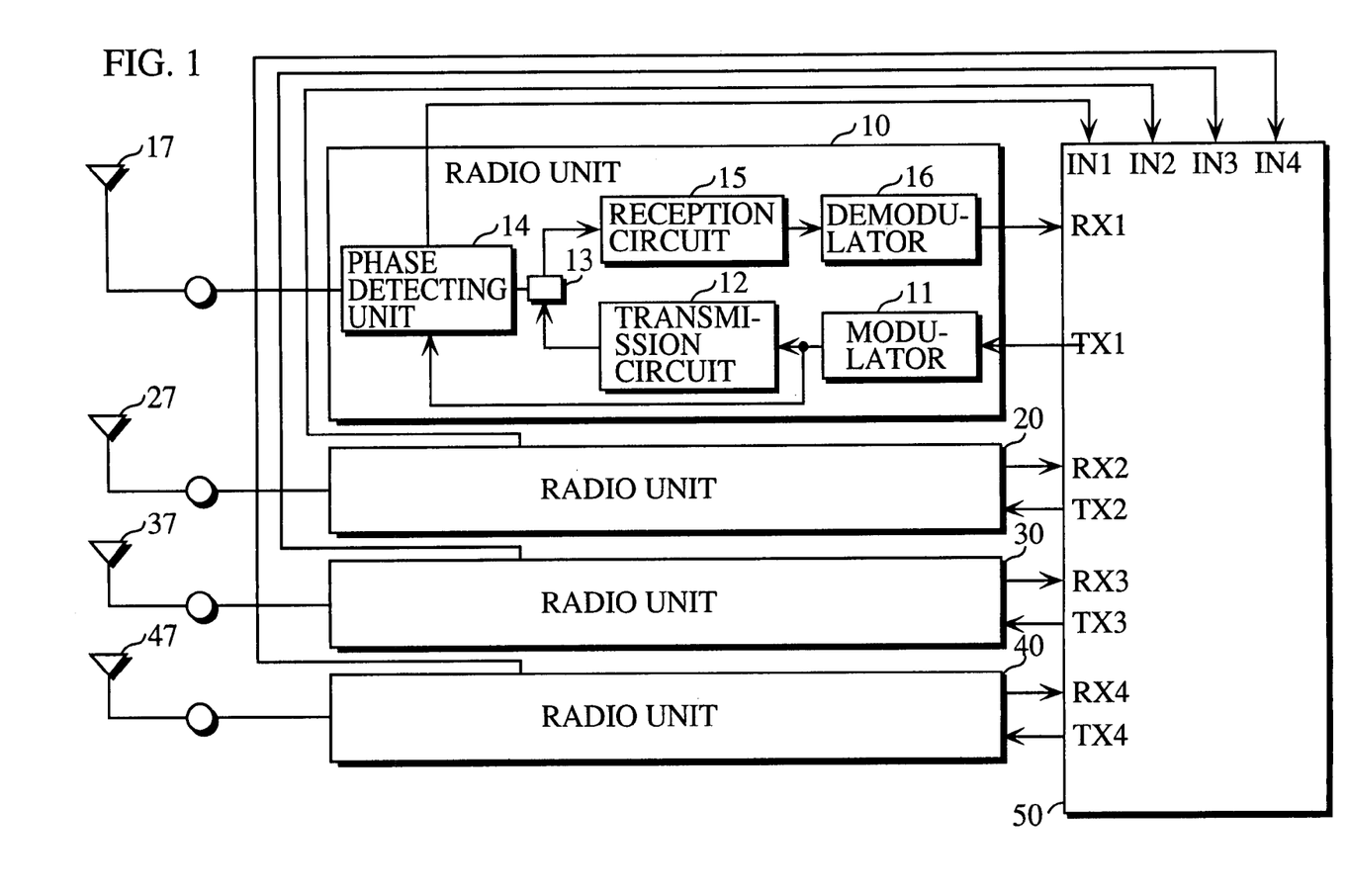
FIG. 1 is a block diagram showing the construction of an adaptive array apparatus that is an embodiment of the present invention.

FIG. 1 is a block diagram showing an adaptive array apparatus that is an embodiment of the present invention. This adaptive array apparatus includes the radio units 10, 20, 30, and 40, the antennas 17, 27, 37, and 47, and the control unit 50. This adaptive array apparatus is provided as a base station for mobile communication using devices such as digital portable telephones. The radio unit 10 includes the modulator 11, the transmission circuit 12, the switch 13, and the phase detecting unit 14.

In the radio unit 10, the modulator 11 modulates a baseband signal (symbol data) that is inputted from the control unit 50 to convert it into an intermediate frequency signal (hereinafter abbreviated to "IF signal"). When doing so, the modulator 11 adds phase data and a compensation value that it receives from the control unit 50 and uses the result to generate the IF signal. This phase data is a phase amount that enables the generation of a same directivity pattern during transmission as during reception. The compensation value compensates for the phase shift in the transmission output due to the differences in characteristics between the transmission circuit 12 and the reception circuit 15. Examples of digital modulation methods that may be used by the modulator 11 are GMSK (Gaussian-filtered Minimum Shift Keying) and π/4 shift QPSK (Quadrature Phase Shift Keying).

The transmission circuit 12 converts the IF signal received from the modulator 11 into a high-frequency signal (hereinafter abbreviated to "RF signal"), and amplifies the RF signal to the transmission output level.

The switch 13 switches between (1) a connection (hereinafter called the "transmission connection") that joins the transmission circuit 12 and the phase detecting unit 14 during transmission, (2) a connection (hereinafter called the "reception connection") that joins the phase detecting unit 14 and the reception circuit 15 during reception, and (3) a connection (hereinafter called the "loopback connection") that joins the transmission circuit 12 and the reception circuit 15 when generating a compensation value.

The phase detecting unit 14 operates as follows. When the modulator 11 has directly inputted an IF signal with a specific phase (this signal being the test signal), the phase detecting unit 14 detects the phase difference between the test signal directly inputted by the modulator 11 and the test signal that has been inputted via the transmission circuit 12. In this way, the phase detecting unit 14 detects a phase shift amount as the propagation characteristics of the transmission circuit 12. The phase detecting unit 14 also allows RF signals to pass as they are between the switch 13 and the antenna 17 during transmission and reception.

When detecting the phase difference, the phase detecting unit 14 converts the test signal inputted via the transmission circuit 12 into an IF signal using a frequency dividing circuit (not illustrated). The phase detecting unit 14 then compares this converted test signal with the test signal that has been directly inputted from the modulator 11 to detect the phase difference. As should be understood, the phase shift characteristics of this frequency dividing circuit are assumed to be sufficiently small as to have no effect on the formation of the directivity pattern.

The reception circuit 15 converts the input signal into an IF signal.

The demodulator 16 demodulates the IF signal received from the reception circuit 15 into a baseband signal.

The radio units 20, 30, and 40 all have the same construction as the radio unit 10 and so will not be described.

The control unit 50 performs control over transmission and reception by the radio units 10, 20, 30, and 40. The control unit 50 also controls the gain and phase of each radio unit so as to realize an adaptive array. In particular, during transmission the control unit 50 outputs a compensation value to each radio unit to compensate for the phase shift in the transmission output due to the differences in characteristics between the transmission circuit and the reception circuit in each radio unit. The control unit 50 also generates a compensation value for each radio unit before transmission.

Figure 2:
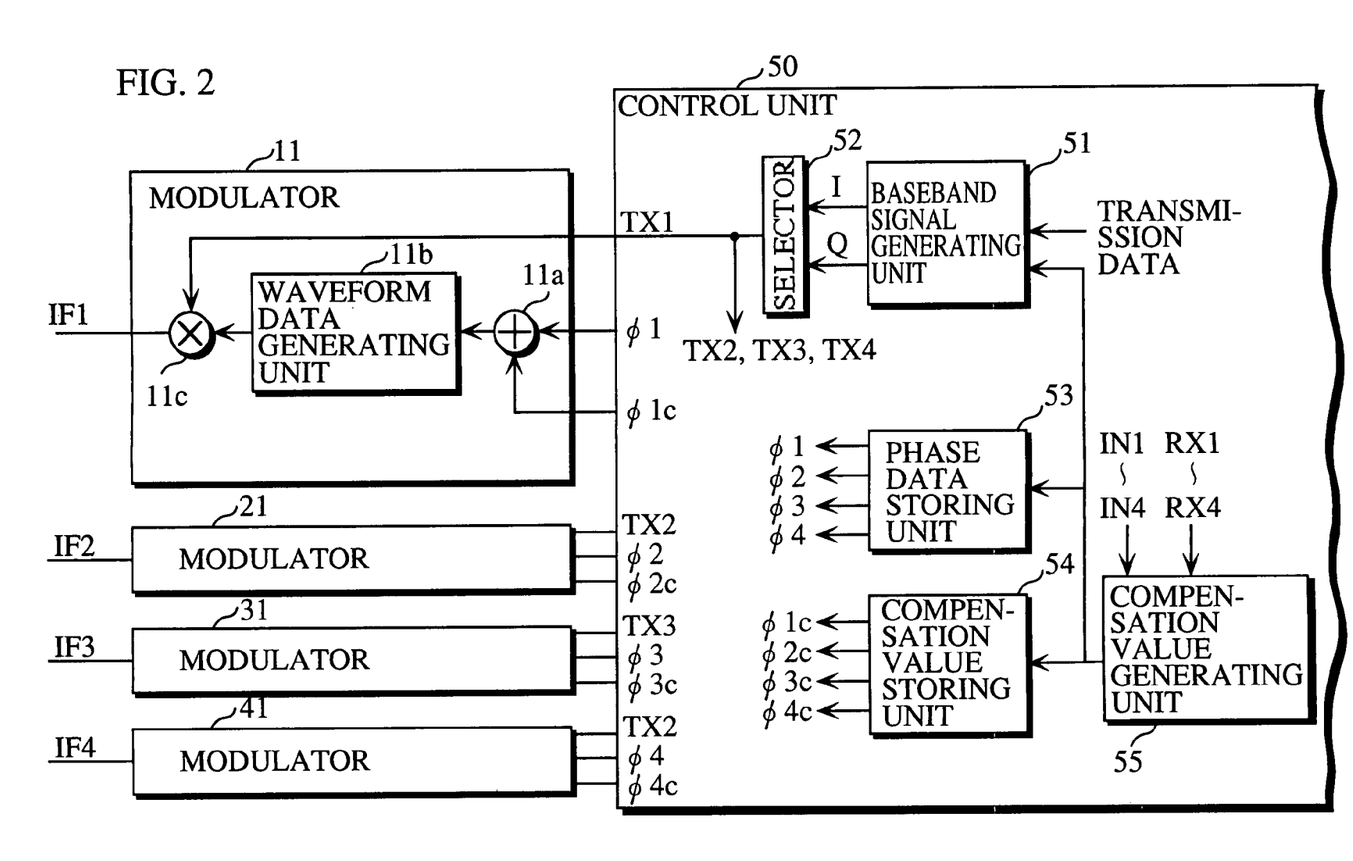
FIG. 2 is a block diagram showing the detailed construction of the components of the control unit 50 and the modulators 11, 21, 31, and 41.

FIG. 2 is a block diagram showing the detailed construction of the components of the control unit 50 and the modulators 11, 21, 31, and 41.

As shown in FIG. 2, the modulator 11 includes the adder 11a, the waveform data generating unit 11b, and the multiplier 11c.

The adder 11a adds the phase data $\phi1$ and the compensation value $\phi1c$ received from the control unit 50. The waveform data generating unit 11b generates sinewave data whose phase matches the addition result of the adder 11a. The multiplier 11c multiplies the sinewave data received from the waveform data generating unit 11b by the transmission data TX1 received from the control unit 50 to generate an IF signal.

As shown in FIG. 2, the control unit 50 includes a baseband signal generating unit 51, a selector 52, a phase data storing unit 53, a compensation value storing unit 54, and a compensation value generating unit 55. Although shown in FIG. 2 as being functionally divided into components, the control unit 50 is in fact composed of a DSP (Digital Signal Processor).

The baseband signal generating unit 51 generates a baseband signal (symbol data) by converting transmission data that is serially inputted into I (in-phase) and Q (quadrature) components. The selector 52 outputs transmission data TX1~TX4 produced by multiplexing the I component and Q component of the baseband signal.

The phase data storing unit 53 stores the phase data $\phi1\sim\phi4$ as phase amounts that are used by the control unit 50 when operating as an adaptive array apparatus to generate a directivity pattern during transmission that is the same as the directivity pattern during reception. Such phase data is explained in detail in *Adaptive Signal Processing for Spatial Regions and Its Technical Applications* (in "Transactions of the Institute of Electronics and Communication Engineers of Japan") Vol. J75-B-II No. 11 November, 1992, and so will not be described here.

The compensation value storing unit 54 stores compensation values $\phi1c\sim\phi4c$ as phase amounts for correcting phase shift in the transmission output due to the differences in characteristics between the transmission circuit and the reception circuit in each radio unit.

Figure 4:
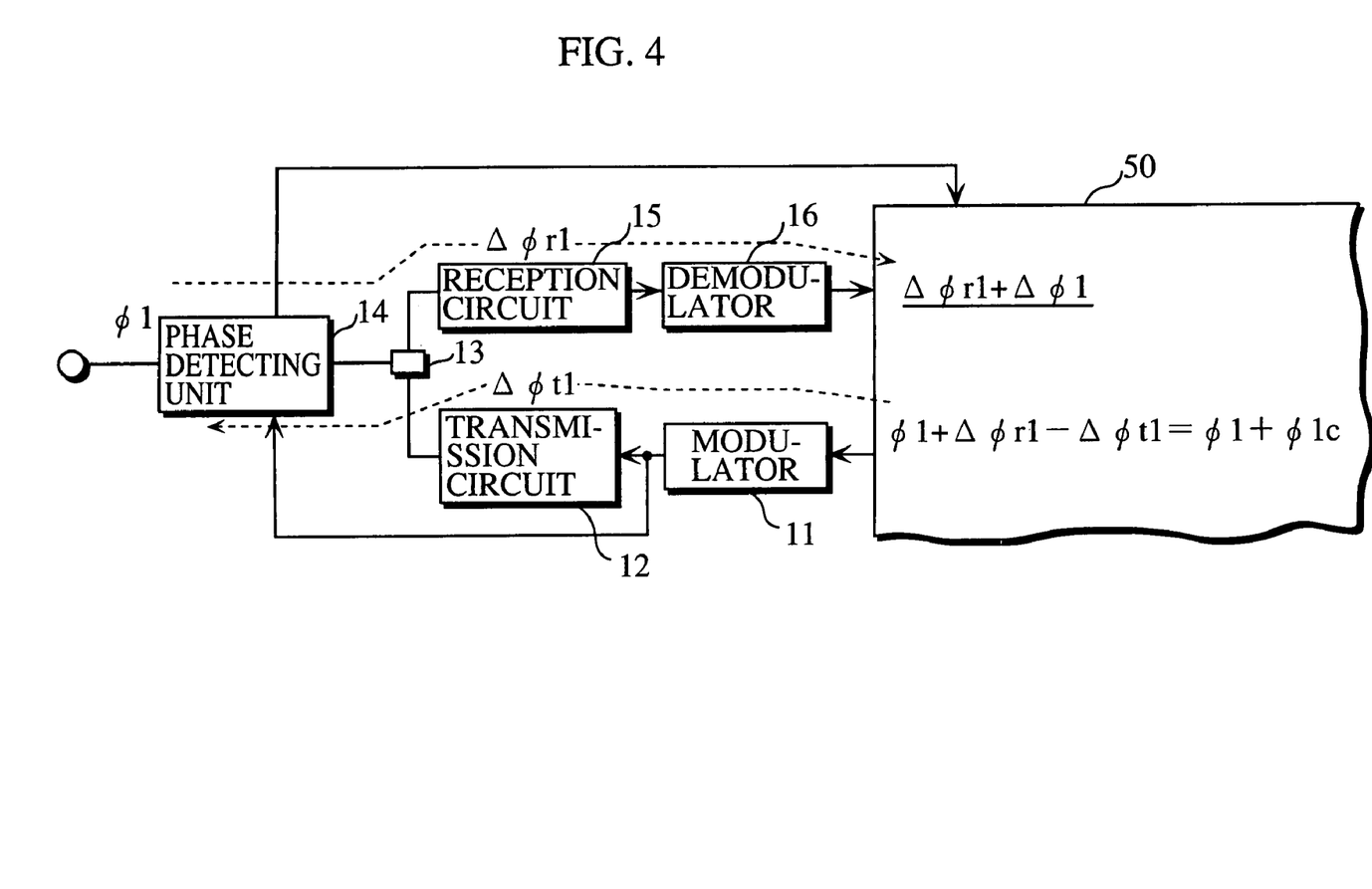
FIG. 4 shows the operation during transmission and reception.

The compensation value generating unit 55 performs a compensation value generation process that generates the compensation values $\phi1c\sim\phi4c$ and has the resulting values stored in the compensation value storing unit 54. The compensation value generating unit 55 performs this compensation value generation process at predetermined intervals. This predetermined interval is preferably several days or several weeks, and should be determined in accordance with the extent to which the phase shift characteristics of the reception circuit 15 and the transmission circuit 12 change over time and the permitted difference in phase shift characteristics As shown in FIG. 4, when an electromagnetic wave is received from another radio device during reception, the received signal RX1 is subject to phase shift of $\Delta\phi r1$ (=0.5°) due to the reception circuit 15.

During transmission, however, transmission data TX1 is compensated by the addition of the compensation value $\phi1c$ (=$\Delta\phi r1-\Delta\phi t1$=0.2°) and the phase data $\phi1$. This transmission data TX1 is transmitted from the antenna via the transmission circuit 12, and so is subject to phase shift of $\Delta\phi t1+\phi1c$=0.2+0.3=0.5°.

In this way the phase shift that occurs inside a radio unit during transmission becomes 0.5° which is equal to the phase shift during reception. This means that the addition of the compensation value makes the phase characteristics of the reception and transmission systems equal.

During reception and transmission, the radio units 20, 30, and 40 all operate in the same way as the radio unit 10, so that no further explanation will be given.

Figure 6:
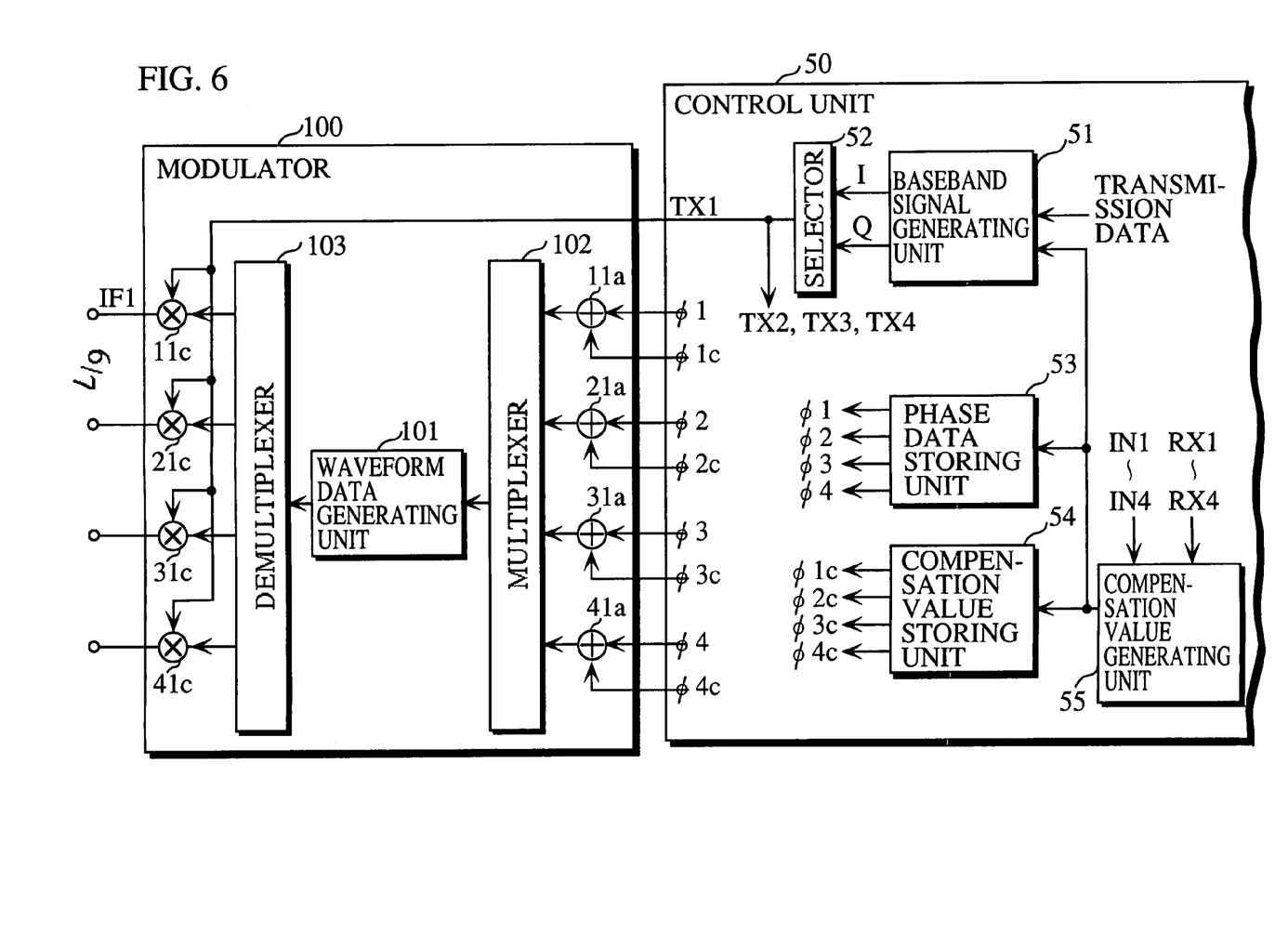
FIG. 6 is a block diagram showing an alternative construction for the components of the control unit 50 and the modulators 11, 21, 31, and 41.

FIG. 6 is a block diagram showing an alternative construction for the components of the control unit 50 and the modulators 11, 21, 31, and 41

FIG. 6 shows a construction where the modulator 100 is used in place of the modulators 11, 21, 31, and 41 of FIG. 2. Here, a single waveform data generating unit compensation value generation process generates the compensation values $\phi1c$, $\phi2c$, $\phi3c$, and $\phi4c$ corresponding to the four radio units and stores the values in the compensation value storing unit 54, as shown by the representation in FIG. 3 and the flowchart in FIG. 5.

The following is a description of how the stored compensation values are used during standard transmission and reception.

In order to generate a directivity pattern, the present adaptive array apparatus adjusts the gain and phase of each radio unit. The adaptive array apparatus adjusts gain according to conventional methods that will not be described.

The present adaptive array apparatus performs phase adjustment by supplying each radio unit with respective phase data $\phi1\sim\phi4$ for the generation of a directivity pattern, by having each radio unit add a respective compensation value $\phi1c\sim\phi4c$ to this phase data, and by having each radio unit use the result of this addition when transmitting.

FIG. 4 shows the operation of the radio unit 10 during transmission and reception. In this example, the phase shift amount $\Delta\phi r1$ of the reception circuit 15 is 0.5° while the phase shift amount $\Delta\phi t1$ of the transmission circuit 12 is 0.3°. For ease of explanation, the phase data $\phi1$ in this example is 0°. value generating unit 55 sets this difference as the compensation value $\phi1c$, and has it stored in the compensation value storing unit 54 (Step 58). Note that the compensation value generating unit 55 calculates this compensation value $\phi1c$ (=$\Delta\phi r1-\Delta\phi t1$) by performing the calculation $(\Delta\phi t1+\Delta\phi r1)-2*(\Delta\phi t1)$ using the detected values $(\Delta\phi t1+\Delta\phi r1)$ and $(\Delta\phi t1)$.

The compensation value generating unit 55 calculates the compensation values $\phi2c$, $\phi3c$, $\phi4c$ ($\Delta\phi r2-\Delta\phi t2$, $\Delta\phi r3-\Delta\phi t3$, $\Delta\phi r4-\Delta\phi t4$) in the same way for the radio units 20, 30, and 40, and has these compensation values stored in the compensation value storing unit 54 (Steps 59, 51).

The above processing generates a separate compensation value for each radio unit and has the resulting values stored in the compensation value storing unit 54.

This completes the description of the construction of the adaptive array apparatus in this embodiment. The operation of this adaptive array apparatus is described below.

The present adaptive array apparatus performs a compensation value generation process before performing ordinary transmission or reception. As mentioned earlier, this compensation value generation process is preferably performed at regular intervals. The route (A). These analog components are the transmission circuit 12 and the reception circuit 15. The compensation value generating unit 55 compares the phase of the test data received via the RX1 terminal with the phase of the original test data, and so detects the phase shift ($\Delta\phi t1+\Delta\phi r1$) of the route (A) (Step 54).

The compensation value generating unit 55 then sets the switch 13 into the transmission connection (Step 55) and retransmits the test data (Step 56). This test data passes on the paths (B) and (C) in FIG. 3 and reaches the phase detecting unit 14. Path (C) differs from path (B) in that it also passes through the transmission circuit 12. This means that the test data on the path (C) is further affected by phase shift due to the transmission circuit 12. The phase detecting unit 14 compares the phase of the test data received on the path (B) with the phase of the test data received on the path (C), and so detects the phase shift Δϕt1 due to the transmission circuit 12. The compensation value generating unit 55 receives this detection result via the IN1 terminal (Step 57).

Having received these detected values (Δϕt1+Δϕr1) and (Δϕt1), the compensation value generating unit 55 finds the difference (Δϕr1−Δϕt1) in between the phase shift of a reception system and the phase shift of a transmission system in a radio unit. The compensation between these components. As one example, if the permitted range for the difference in phase shift characteristics is −10% ~+10%, the predetermined interval will be set so that the compensation value will be updated before the difference in phase shift characteristics between the transmission circuit 12 and the reception circuit 15 exceeds this −10% ~+10% range. This means that the compensation value generating unit 55 updates the compensation values according to changes over time in the radio units.

Figure 5:
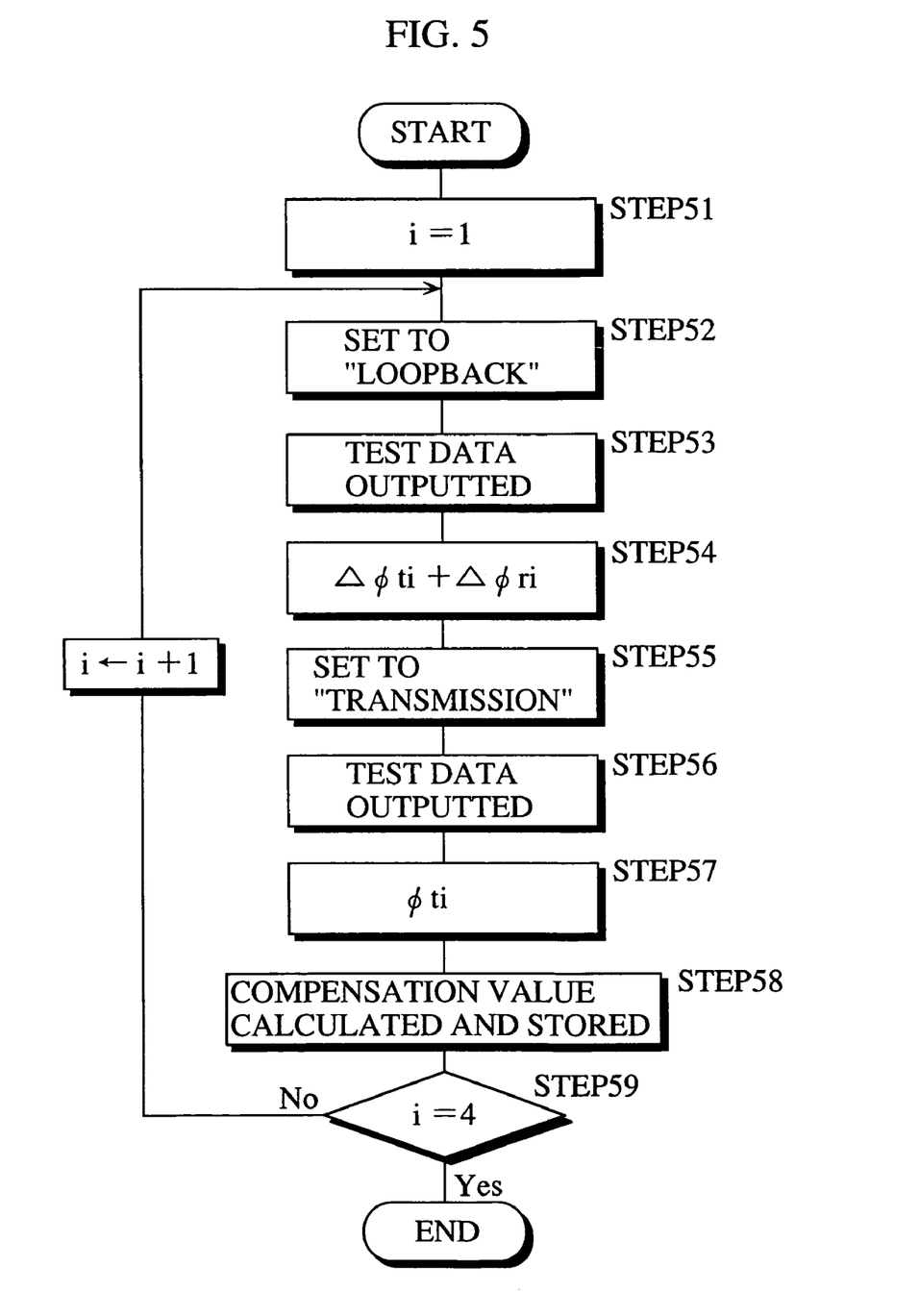
FIG. 5 is a flowchart showing the details of the processing by the compensation value generating unit 55 when generating a compensation value.

FIG. 5 is a flowchart showing the details of the processing by the compensation value generating unit 55 when generating a compensation value. This compensation value generation process is explained below using FIG. 3.

The compensation value generating unit 55 first operates for radio unit 10 (Step 51 in FIG. 5). The compensation value generating unit 55 sets the switch 13 in the loopback connection (Step 52), and outputs test data with a specified phase (Step 53). As one example, the compensation value generating unit 55 may output test data where the phase data ϕ1, the compensation value ϕ1c, and the transmission data TX1 are all zero.

Figure 3:
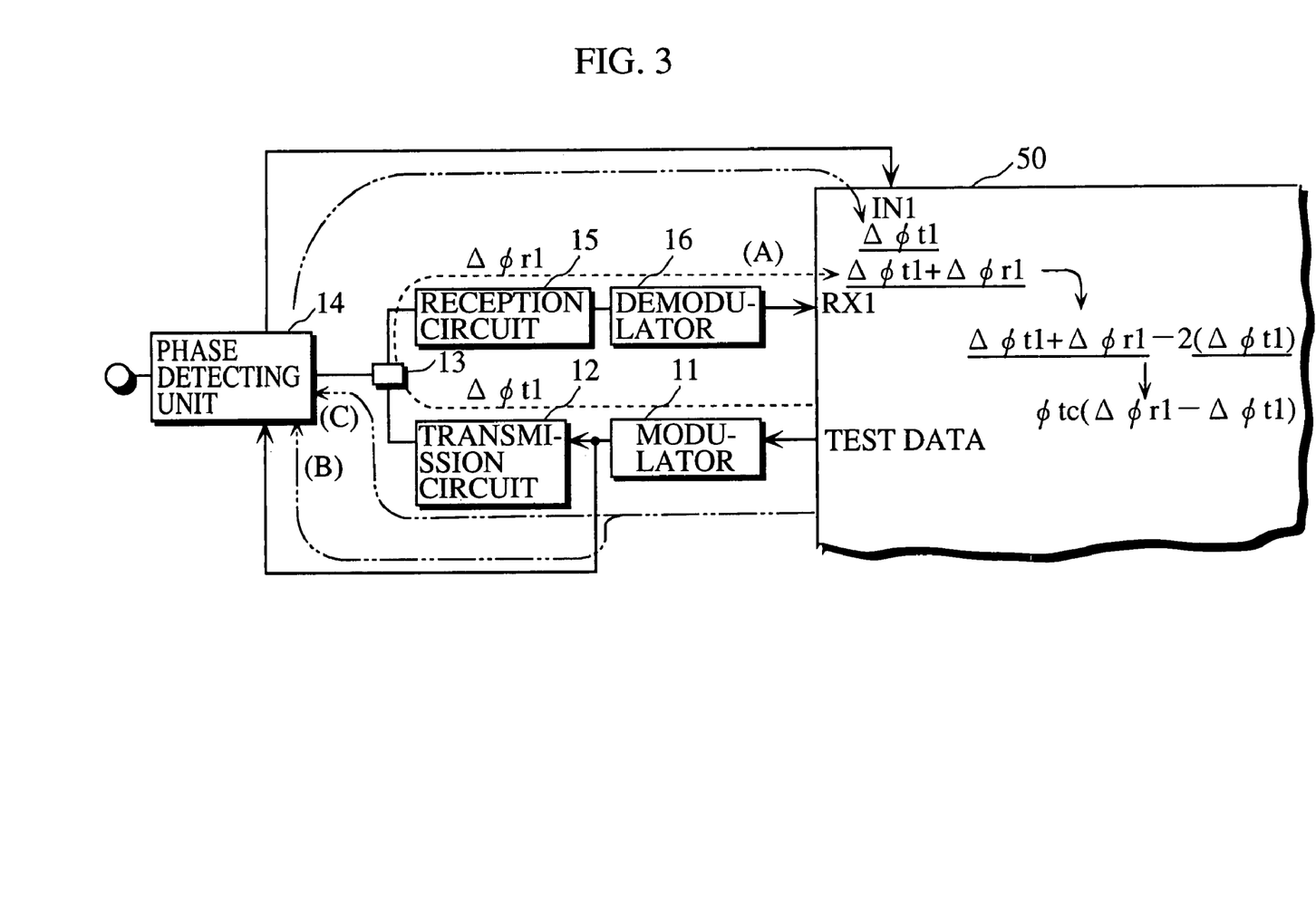
FIG. 3 shows the process that generates a compensation value.

The outputted test data reaches the RX1 terminal of the control unit 50 via the route shown as (A) in FIG. 3. The phase of the test data will be affected by the components, especially the analog components, on this 101 is shared between the four radio units 10, 20, 30, and 40. The multiplexer 102 and the demultiplexer 103 are also provided to enable this sharing of waveform data generating unit 101.

The waveform data generating unit 101 has a processing speed that is four times faster than each of the waveform data generating units 11b, 21b, 31b, and 41b of FIG. 2. Consequently, the multiplexer 102 multiplexes the four addition results of the four adders 11a, 21a, 31a, and 41a according to time division and outputs the multiplexed addition results to the waveform data generating unit 101. The demultiplexer 103 distributes each waveform generated by the waveform data generating unit 101 to an appropriate multiplier out of the multipliers 11c, 21c, 31c, and 41c.

Quadrupling the processing speed of the modulator 100 in this way enables a reduction in the number of components and consequently a reduction in a dimensions of the circuit.

Figure 7:
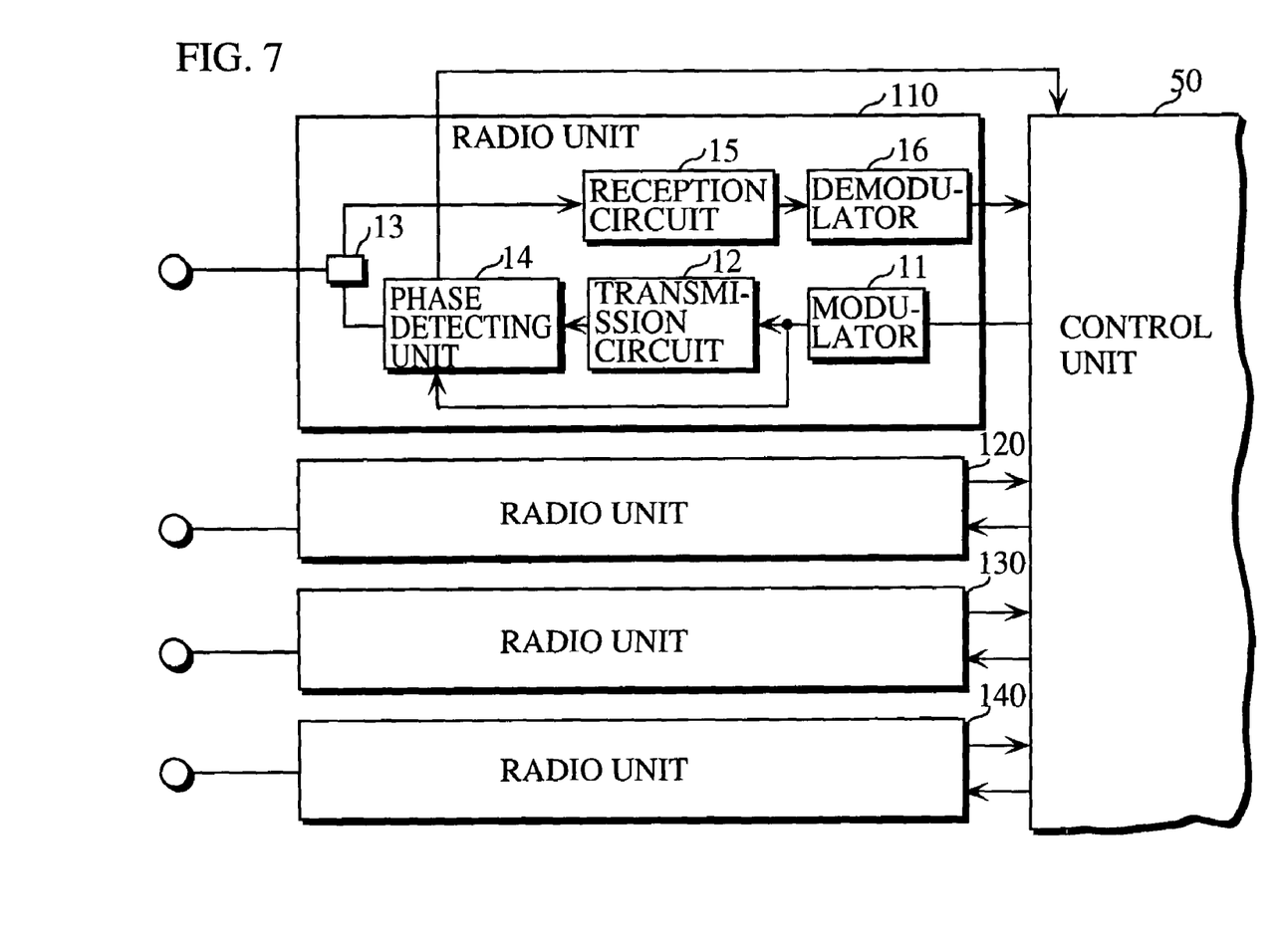
FIG. 7 is a block diagram showing the construction of an adaptive array apparatus in a different embodiment of the present invention.

FIG. 7 is a block diagram showing the construction of an adaptive array apparatus in a different embodiment of the present invention. This adaptive array apparatus only differs from the construction in FIG. 1 by including the radio units 110, 120, 130, and 140 in place of the radio units 10, 20, 30, and 40. The following explanation will focus on this difference.

The radio unit 110 only differs from the radio unit 10 in having the phase detecting unit 14 provided between the transmission circuit 12 and the switch 13. That aside, all functions of the radio unit 110 are the same as those of the radio unit 10.

The radio units 120, 130, and 140 are the same as the radio unit 110, and so will not be explained.

The repositioning of the phase detecting unit 14 in this embodiment facilitates the installation of the phase detecting unit 14. Note that the phase detecting unit 14 may instead be provided between the switch 13 and the reception circuit 15.

The compensation value generation process in this embodiment should preferably be performed regularly, with the interval between executions being determined according to the extent to which the characteristics of the circuit elements change over time. When circuit components whose characteristics hardly change are used, a compensation value for each radio unit may be written into the compensation value storing unit 54 at the factory before shipment. In this case, the compensation value generating unit 55 and phase detecting unit 14 in FIG. 2 become unnecessary.

INDUSTRIAL APPLICABILITY

The adaptive array apparatus of the present invention corrects phase during transmission according to a difference in phase shift between the transmission circuit and the reception circuit. Even when there is a large difference in characteristics between the transmission circuit and the reception circuit, the directivity pattern for transmission can be made the same as the directivity pattern for reception. This is especially effective when low-cost components are used in the transmission circuit and reception circuit of a base station used in mobile communication, since such the difference in characteristics between such components would otherwise be problematic.

The invention claimed is:

1. An adaptive array apparatus that includes a plurality of radio units that each has a transmitting unit, a receiving unit, and an antenna,
   the adaptive array apparatus comprising:
   storing means for storing a separate compensation value for each radio unit, each compensation value reflecting phase propagation characteristics of the receiving unit and the transmitting unit in the corresponding radio unit;
   compensating means for compensating, for each radio unit, a phase amount used when generating a directivity pattern for an output signal by adding the compensation value corresponding to the radio unit to the phase amount; and
   generating means for generating the compensation value for each radio unit in accordance with the phase propagation characteristics of the receiving unit and the transmitting unit in the radio unit, wherein the generating means includes:
   a generating unit for generating test signals;
   a first detecting unit for detecting, when a test signal passes the transmitting unit in a radio unit, a first phase shift value for the radio unit;
   a second detecting unit for detecting, when the test signal passes the transmitting unit and the receiving unit in order in the radio unit, a second phase shift value for the radio unit; and
   a calculating unit for calculating a phase shift difference between the receiving unit and the transmitting unit in a radio unit using the first phase shift value and the second phase shift value of the radio unit, and for setting the calculated phase shift difference as the compensation value for the radio unit.

2. The adaptive array apparatus of claim 1,
   wherein the calculating unit calculates the compensation values by performing a subtraction using the second phase shift value and a value that is double the first phase shift value.

3. The adaptive array apparatus of claim 2,
   wherein the generating means generates the compensation values at a predetermined interval.

4. The adaptive array apparatus of claim 3,
wherein the predetermined interval used by the generating means is a period that is determined according to
(1) a degree to which a difference in phase shift amounts between the transmitting unit and the receiving unit of a radio unit changes over time, and
(2) a permitting range for the difference in phase shift amounts.

5. The adaptive array apparatus of claim 1,
wherein the generating means generates the compensation values at a predetermined interval.

6. The adaptive array apparatus of claim 5,
wherein the predetermined interval used by the generating means is a period that is determined according to
(1) a degree to which a difference in phase shift amounts between the transmitting unit and the receiving unit of a radio unit changes over time, and
(2) a permitting range for the difference in phase shift amounts.

7. A compensation method for use in an adaptive array apparatus that includes a plurality of radio units that each has a transmitting unit, a receiving unit, and an antenna, the compensation method compensating a phase amount that is used when generating a directivity pattern,
the compensation method comprising:
   a generating step for generating a separate compensation value for each unit, each compensation value reflecting phase propagation characteristics of the receiving unit and the transmitting unit in the corresponding radio unit, and
   a compensating step for compensating, for each radio unit, a phase amount used when generating a directivity pattern used for an output signal by adding the compensation value generated for the radio unit in the generating step to the phase amounts,
wherein the generating step includes:
   an outputting step for outputting test signals;
   a first detecting step for detecting, when a test signal passes the transmitting unit in a radio unit, a first phase shift value for the radio unit;
   a second detecting step for detecting when the test signal passes the transmitting unit and the receiving unit in order in the radio unit, a second phase shift value for the radio unit; and
   a calculating step for calculating a phase shift difference between the receiving unit and the transmitting unit in a radio unit using the first phase shift value and the second phase shift value of the radio unit, and for setting the calculating phase shift difference as the compensation value for the radio unit.

8. The compensation method of claim 7,
wherein the calculating step calculates the compensation values by performing a subtraction using the second phase shift value and a value that is double the first phase shift value.

9. The compensation method of claim 8,
wherein the generating step generates the compensation values at a predetermined interval.

* * * * *